United States Patent [19]

Kung

[11] Patent Number: 5,555,032
[45] Date of Patent: Sep. 10, 1996

[54] INTEGRATED CIRCUIT FOR ECONOMIZING POWER CONSUMPTION OF A MONITOR BY USING TWO REFERENCE VALUES FOR DISCRMINATING THE INPUT SIGNAL

[75] Inventor: Yung-Keng Kung, Hsin, Taiwan

[73] Assignee: Weltrend Semiconductor, Inc., Hsin, Taiwan

[21] Appl. No.: 239,737

[22] Filed: May 9, 1994

[51] Int. Cl.⁶ .................................................. H04N 5/63
[52] U.S. Cl. .................... 348/730; 348/805; 345/211; 395/750
[58] Field of Search ........................... 348/730, 805, 348/380, 372; 345/211, 212, 213; 395/750; 364/273.1, 273.5; 307/126, 129; H04N 5/63, 5/68

[56] References Cited

U.S. PATENT DOCUMENTS

| | | | |
|---|---|---|---|
| 4,975,592 | 12/1990 | Hahn et al. | 348/730 |
| 5,175,441 | 12/1992 | den Hollander | 348/730 |
| 5,341,179 | 8/1994 | Konishi | 348/730 |
| 5,389,952 | 2/1995 | Kikinis | 345/213 |
| 5,398,048 | 3/1995 | O'Mahony | 345/212 |

FOREIGN PATENT DOCUMENTS

| | | | |
|---|---|---|---|
| 4140987 | 5/1992 | Japan | H04N 5/63 |
| 4291390 | 10/1992 | Japan | 345/212 |

*Primary Examiner*—Victor R. Kostak
*Assistant Examiner*—Nathan J. Flynn
*Attorney, Agent, or Firm*—Christie, Parker & Hale, LLP

[57] ABSTRACT

An integrated circuit for power management adapted to be used with a monitor which comprises a signal discriminator storing two reference values therein for being put in comparison with an input signal and generating an output signal according to the comparison, a clock generator adapted to be electrically connected to an oscillating circuit generating an oscillating signal, receiving and processing said oscillating signal to provide a clock input for the integrated circuit for power management, and a decoder decoding the output signal to enable the monitor in a desired operation state. The present integrated circuit for power management can not only prolong the lifetime of a cathode-ray tube but can also economize power consumption in consideration of environmental protection and economy. In addition, the present integrated circuit is more space-saving and cost-effective than a conventional device for economizing power consumption.

24 Claims, 3 Drawing Sheets

INTEGRATED CIRCUIT FOR ECONOMIZING POWER CONSUMPTION OF A MONITOR BY USING TWO REFERENCE VALUES FOR DISCRMINATING THE INPUT SIGNAL

FIELD OF THE INVENTION

The present invention relates to an integrated circuit for power management, and more particularly to an integrated circuit for power management to be used with a monitor.

BACKGROUND OF THE INVENTION

In the past, most monitors did not have a device for economizing power consumption because there was no standardized criteria. Some monitors use devices of hardware circuits or software programs to control the appearance of pictures shown on the screens by way of making cathode-ray tubes stop shooting electrons when no signal has been inputted. When this occurs, there are no pictures on the screens but the monitors are still in a power-on operation state. Therefore, these kinds of devices can protect the cathode-ray tube of a monitor and prolong the lifetime of the cathode-ray tube, but cannot economize power consumption. In some monitors with a device for economizing power consumption, a TTL voltage logic level and other elements are used to construct a circuit in a circuit board but the device occupies too much space. Besides, a device of this kind is not accurate in determining the existence of a signal because determines whether the signal is exsistent only by one reference value, i.e., the monitor is under a power-on operation state when the frequency of an input signal is greater than the reference value but a power-off operation state when the relevant frequency is lower than the reference value. This results in a harmful effect on the monitor if the frequency of the input signal is around the reference value and the operation state of the power is intermittently switched between ON and OFF.

It is therefore attempted by the Applicant to deal with the situation encounted by the prior art.

SUMMARY OF THE INVENTION

An object of the present invention is to offer an integrated circuit adapted to be used with a monitor for power management, which is more space-saving and cost-effective than conventional devices.

Another object of the present invention is to offer an integrated circuit adapted to be used with a monitor for power management, which is capable of at least alleviating the harmful effect mentioned above by using two reference values to provide a buffer thereagainst.

In accordance with the present invention, an integrated circuit adapted to be used with a monitor for power management comprises a signal discriminator storing two reference values therein for comparison with an input signal and generating an output signal according to the comparison, a clock generator adapted to be electrically connected to an oscillating circuit generating an oscillating signal, receiving and processing said oscillating signal to provide a clock input for the integrated circuit for power management, and a decoder decoding the output signal to enable the monitor in a desired operation state.

In accordance with another aspect of the present invention, the desired operation state is one selected frown an OFF operation state, a SUSPEND operation state, a STAND-BY operation state or an ON operation state.

In accordance with another aspect of the present invention, the input signal is an input frequency signal having a horizontal synchronizing input frequency and a vertical synchronizing input frequency.

In accordance with another aspect of the present invention, the signal discriminator includes a horizontal synchronous signal discriminating circuit, and a vertical synchronizing signal discriminating circuit respectively, discriminating the horizontal input frequency and the vertical synchronizing input frequency.

In accordance with another aspect of the present invention, each of the horizontal synchronizing signal discriminating circuit and the vertical synchronizing signal discriminating circuit comprises a programmable logic array to set the two reference values.

In accordance with another aspect of the present invention, the two reference values are a first reference value and a second reference value greater than the first reference value.

In accordance with another aspect of the present invention, the input signal is determined to exist when the input signal has a frequency increased from a lesser value to a value greater than the second reference value, but is determined to be ignored when the input signal frequency decreases from a greater value to a value less than the first reference value.

In accordance with another aspect of the present invention, the integrated circuit for power management further comprises a time-delaying and checking device which is electrically connected between the signal discriminator and the decoder, transmits the output signal outputted by the signal discriminator to the decoder if the input signal is existent, and waits for a delay time to ascertain whether the input signal is really ignored before transmitting the output signal to the decoder if the input signal is ignored.

In accordance with another aspect of the present invention, the delay time is set by a delay-time selector which has three kinds of time durations including 6 seconds, 12 seconds and 48 seconds.

In accordance with another aspect of the present invention, the integrated circuit for power management has eight pins, respectively, for an input end for the horizontal synchronizing signal, an input end for the vertical synchronizing signal, the oscillating circuit, an output end for the OFF operation state, an output end for the SUSPEND operation state, an output end for the STAND-BY operation state, a ground and a power source, wherein the output end for the STAND-BY operation state can be replaced by an input end for a DELAY signal.

In accordance with another aspect of the present invention, the DELAY signal varies with various input voltage states supplied for the integrated circuit and including a high voltage state, a grounding state and a floating state.

In accordance with another aspect of the present invention, the oscillating circuit is a one-pinned crystal oscillating circuit so that the integrated circuit for power management has one pin thereof electrically connected to the one-pinned crystal oscillating circuit.

In accordance with another aspect of the present invention, the clock generator provides various clock inputs for the integrated circuit.

In accordance with another aspect of the present invention, the integrated circuit for power management further comprises a latch electrically connected to the decoder for latching the decoder, a Schmitter trigger electrically connected to the signal discriminator to change a voltage logic level of the input signal into a voltage logic level for the integrated circuit for power management, a multiplexer electrically connected between the signal discriminator and the decoder, and a delay line electrically connected between the signal discriminator and the decoder for ensuring that the integrated circuit will work steadily from a beginning.

In accordance with another aspect of the present invention, the voltage logic level of the input frequency is a TTL one and the voltage logic level for the integrated circuit for power management is a MOSFET one.

The present invention may be best understood through the following description with reference to the accompanying drawings, in which:

DETAILED DESCRIPTION OF THE PREFERRED EMBODIMENT

Figures 1A, 1B:
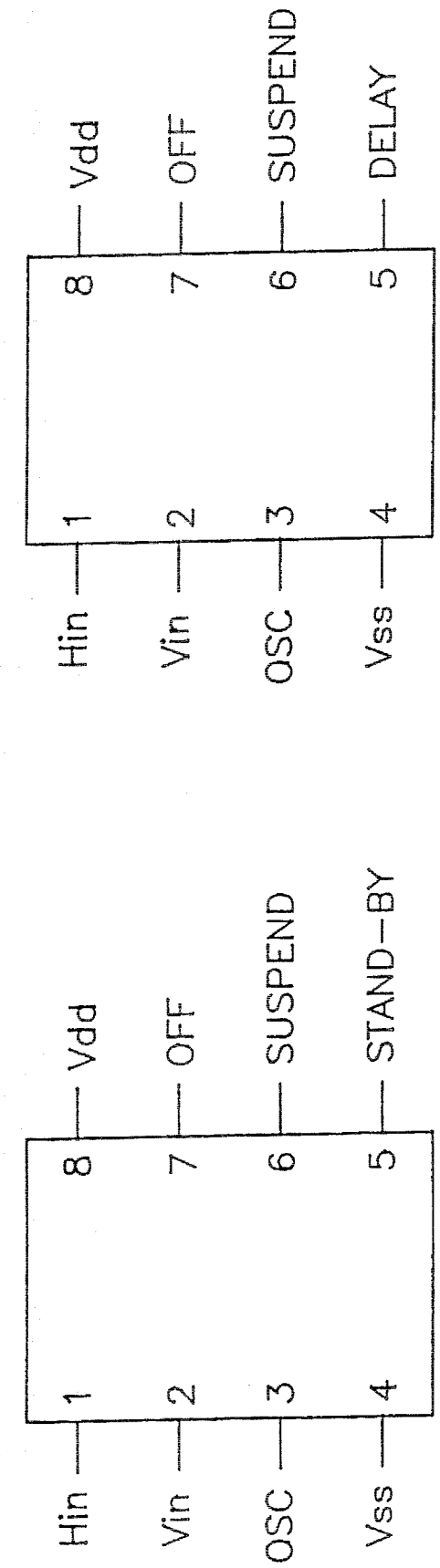
FIGS. 1A & 1B are schematic diagrams showing the outward appearance of an integrated circuit adapted to be used with a monitor for power management according to the present invention.

At the present time, the concept of environmental protection is widespread all over the world and those who are engaged in information technology also pay particular attention to these concepts. Among courses of environmental protection, economizing power consumption is one of the most important ones. In order to cope with the related criteria established by American Video Electronics Standards Association and to match the specifications stipulated by Display Power Management Signaling (DPMS), the present integrated circuit used with a monitor for power management is produced. According to the specifications stipulated by DPMS, the power supply of a monitor is classified into four kinds of operation states responsive to four kinds of input signals shown in Table 1.

TABLE 1

| operation state | horizontal signal | vertical signal | picture | power saving | recovery time |
|---|---|---|---|---|---|
| ON | P | P | Y | – | – |
| STAND-BY | NP | P | N | + | + |
| SUSPEND | P | NP | N | ++ | ++ |
| OFF | NP | NP | N | +++ | +++ |

In the Table,
P: with pulse Y: with picture –: zero ++: some
NP: without pulse N: without picture +: little +++: much
recovery time: the time needed to restore to an ON operation state The input signals mainly include horizontal signals and vertical synchronizing signals. The definition that a horizontal synchronizing signal pulse is existent is that the frequency of the horizontal synchronizing input signal is greater than 10 KHz. The definition that a vertical synchronizing signal pulse is existent is that the frequency of the vertical synchronizing input signal is greater than 40 Hz.

The definition that each of the synchronizing signal pulses is ignored is that the frequency of the synchronizing input signal is less than 10 Hz.

The objective of dividing the power supply into four kinds of operation states are to economize power consumption and to prolong the lifetime of a cathode-ray tube. If a monitor does not receive a horizontal synchronizing signal and a vertical synchronizing signal at the same time, the cathode-ray tube will not shoot any electron to a screen and the screen will be in a blanking state. This protects the cathode-ray tube. As shown in Table 1, the reason why a SUSPEND operation state economizes power consumption more effectively than a STAND-BY operation state does is that signals of monitors are primarily loaded in horizontal ones. Nevertheless, the recovery time increases with the decreased power consumption, i.e., more time is needed to recover to an ON operation state from a SUSPEND operation state than from a STAND-BY operation state. Among the four kinds of operation states, the ON, SUSPEND and OFF ones are compulsorily required by DPMS while the STAND-BY one is optional.

The present invention will now be described more specifically with reference to the following examples. It is to be noted that the following descriptions of preferred embodiments of this invention are presented herein for purposes of illustration and description only; it is not intended to be exhaustive or to be limited to the precise form disclosed.

The present invention is an eight-pinned IC adapted to be used with a monitor for power management and manufactured according to specifications stipulated by DPMS. FIG. 1A shows an IC whose eight pins are numbered 1–8, respectively, for an input end for the horizontal synchronizing signal Hin, an input end for the vertical synchronous signal Vin, the oscillating circuit OSC, a ground Vss, a power source Vdd, an output end for the STAND-BY operation state, an output end for the SUSPEND operation state, an output end for the OFF operation state, and FIG. 1B is similar to FIG. 1A except that the pin for the output end for the STAND-BY operation state is replaced by that for an input end for a DELAY signal.

Figure 2:
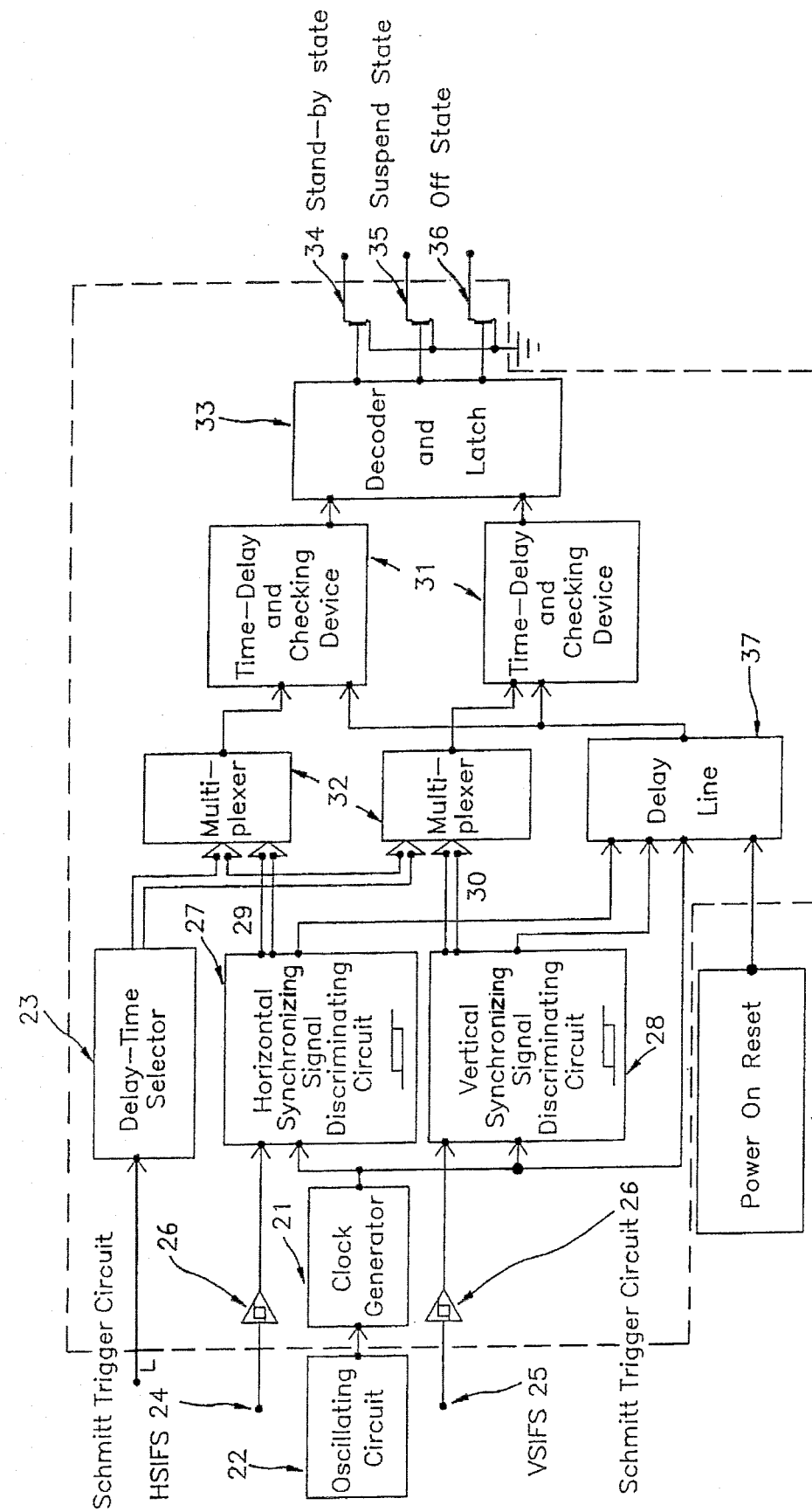
FIG. 2 is a schematic block diagram showing a preferred embodiment of an integrated circuit adapted to be used with a monitor for power management according to the present invention.

Referring now to FIG. 2, in a preferred embodiment of an IC adapted to be used with a monitor for power management according to the present invention, a clock generator 21 is electrically connected to an oscillating circuit 22 generating an oscillating signal, and receives and processes the oscillating signal to provide a clock input for the IC for power management. The delay-time selector 23 is electrically selectably connected to a high voltage, a ground or a floating state to provide three kinds of delay-time durations, i.e., 6 seconds, 12 seconds and 48 seconds for choice. The function of delay time is to prevent the relevant system from malfunctioning when an input signal is suddenly changed. A horizontal synchronizing input frequency signal (HSIFS) 24 and a vertical synchronizing input frequency signal (VSIFS) 25 are first changed from a TTL voltage logic level into a MOS one required by the inner circuit of the IC through two Schmitt trigger circuits 26 which also change the wave is forms of the input signals, and secondly enter a horizontal synchronizing signal discriminating circuit 27 and a vertical synchronizing signal discriminating circuit 28, respectively, to be discriminated by being compared with two reference values stored in the synchronizing signal discriminating circuits 27 and 28. After the signals 24 and 25 are discriminated, the synchronizing signal discriminating circuits 27 and 28, and output signals 29 and 30 are transmitted to time-delaying and checking devices 31 through multiplexers 32. The multiplexers 32 are also responsible for informing the time-delaying and checking devices 31 of delay time decided by the delay-time selector 23 and informing the clock generator 21 to choose a suitable clock input according to the decided delay time. The time-delaying and checking devices 31 transmit the signals 29 and 30 to a decoder and latch 33 if the output signals 29 and 30 are present, and wait for the delay time to ascertain whether the output signals 29 and 30 are really ignored before transmitting the output signals 29 and 30 to the decoder and latch 33 if the output signals 29 and 30 are ignored. The decoder and latch 33 decodes the output signals 29 and 30 and latch the results to enable the relevant monitor in one of the following operation states, i.e., a STAND-BY one 34, a SUSPEND one 35 and an OFF one 36. A delay line 37 electrically connected to a built-in power ON reset 38 functions to delay a certain time for ensuring that the IC will work steadily from a beginning.

Figure 3A:
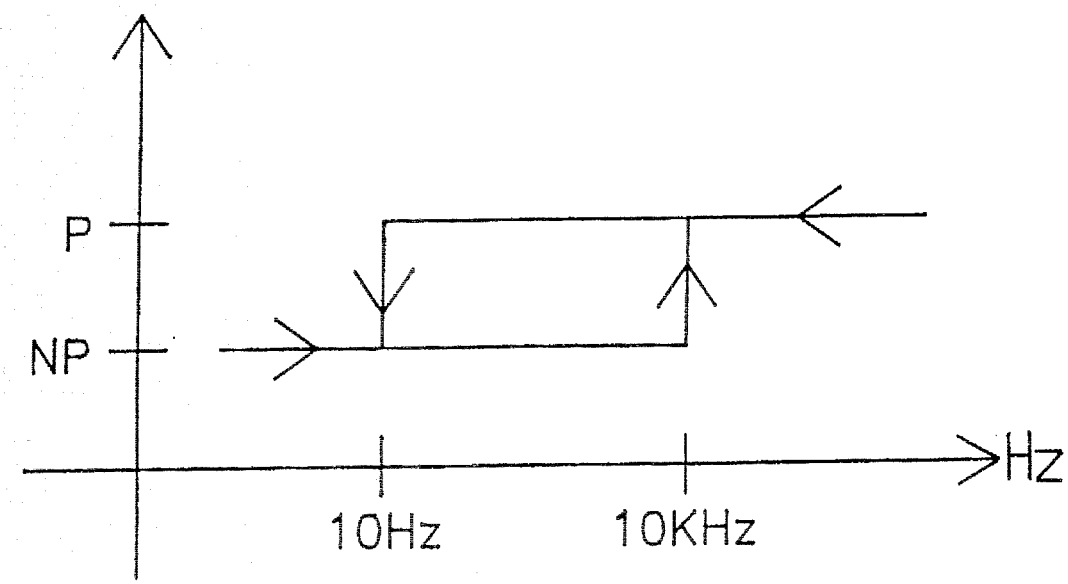
FIGS. 3A & 3B are schematic charts showing a discriminating process for an input frequency signal according to an integrated circuit adapted to be used with a monitor for power management of the present invention.
Figure 3B:
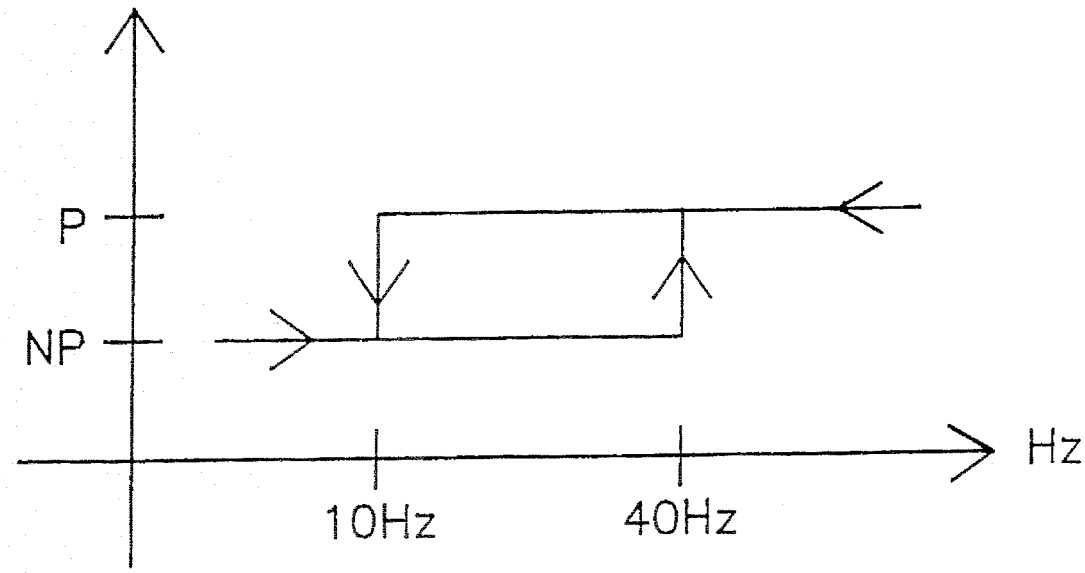

The horizontal synchronizing signal discriminating circuit 27 and the vertical synchronizing signal discriminating circuit 28 comprises programmable logic arrays to respectively set respective reference values, Fh1, Fh2, Fv1 and Fv2, wherein Fh1 is less than Fh2 and Fv1 is less than Fv2. Each of the input signals 24 and 25 is determined to be existent when the frequency of the input signal is greater than Fh2 or Fv2, but determined to be ignored when the frequency is less than Fh1 or Fv1. If the frequency of the input signal is between Fh1 and Fh2 or between Fv1 and Fv2, the input signal will be determined according to the following principle: the input signal is determined to be existent when the frequency of the input signal increases from a lesser value to a value greater than Fh2 or Fv2, but determined to be ignored when the frequency decreases from a greater value to a value less than Fh1 or Fv1. FIG. 3A is a schematic chart showing a discriminating process for a horizontal synchronizing input frequency signal according to an integrated circuit adapted to be used with a monitor for power management of the present invention, wherein Fh1 is 10 Hz and Fh2 is 10 KHz. FIG. 3B is a schematic chart showing a discriminating process for a vertical synchronizing input frequency signal according to an integrated circuit adapted to be used with a monitor for power management of the present invention, wherein Fv1 is 10 Hz and Fv2 is 40 Hz. These charts are of hysteretic nature, wherein the symbol P represents that there is a pulse and the symbol NP represents that there is no pulse.

In summary, the present invention packs up the conventional device for economizing power consumption into an eight-pinned IC which is more space-saving and cost-effective. The present IC for power management uses only one pin to be electrically connected to an external one-pinned oscillating circuit The present invention uses two reference values instead of only one for discriminating the input signal to avoid the power being intermittently switched between ON and OFF. Furthermore, the present invention divides the power supply into four kinds of operation states responsive to different signal groups to flexibly economize power consumption and shorten the recovery time to an ON operation state.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What we claim is:

1. An integrated circuit adapted to be used with a monitor for power management and responsive to at least one synchronizing signal on an input signal, comprising:

a signal discriminator for storing two reference values for each of said at least one synchronizing signal and generating an output signal according to a comparison between said two reference values and said input signal;

a clock generator adapted to be electrically connected to an external oscillating circuit generating an oscillating signal, and receiving and processing said oscillating signal to provide a clock for said integrated circuit for power management; and a decoder for decoding said output signal to enable said monitor in a desired state.

2. An integrated circuit for power management according to claim 1, wherein said desired operation state is one selected from an OFF is operation state, a SUSPEND operation state, a STAND-BY operation state or an ON operation state.

3. An integrated circuit for power management according to claim 1, wherein said input signal includes a horizontal synchronizing input signal and a vertical synchronizing input signal.

4. An integrated circuit for power management according to claim 3, wherein said signal discriminator includes a horizontal synchronizing signal discriminating circuit and a vertical synchronizing signal discriminating circuit respectively discriminating said horizontal synchronizing input signal frequency and said vertical synchronizing input signal frequency.

5. An integrated circuit for power management according to claim 4, wherein each of said horizontal synchronizing signal discriminating circuit and said vertical synchronizing signal discriminating circuit comprises a programmable logic array to set said two reference values.

6. An integrated circuit for power management according to claim 5, wherein said two reference values are a first reference value and a second reference value greater than said first reference value.

7. An integrated circuit for power management according to claim 6, wherein said input signal is determined to be existent when said input signal has a frequency increased from a lesser value to a value greater than said second reference value, and determined to be ignored when said input signal frequency decreases from a greater value to a value less than said first reference value.

8. An integrated circuit for power management according to claim 7, further comprising a time-delaying and checking device which is electrically connected between said signal discriminator and said decoder for transmitting said output signal outputted by said signal discriminator to said decoder if said input signal is existent, and waiting for a delay time to ascertain whether said input signal is really ignored before transmitting said output signal to said decoder if said input signal is ignored.

9. An integrated circuit for power management according to claim 8, wherein said delay time is set by a delay-time selector.

10. An integrated circuit for power management according to claim 9, wherein said delay times include 6 seconds, 12 seconds and 48 seconds.

11. An integrated circuit for power management according to claim 1, wherein said integrated circuit has eight pins.

12. An integrated circuit for power management according to claim 11, wherein said eight pins comprise an input end for a horizontal synchronizing input signal, an input end for a vertical synchronizing input signal, an input end for said oscillating signal, an output end for an OFF operation state, an output end for a SUSPEND operation state, an output end for a STAND-BY operation state, a ground input and a power source input.

13. An integrated circuit for power management according to claim 11, wherein said eight pins comprise an input end for a horizontal synchronizing input signal, an input end for a vertical synchronizing input signal, an input end for said oscillating signal, an output end for an OFF operation state, an output end for a SUSPEND operation state, an input end for a DELAY signal, a ground input and a power source input.

14. An integrated circuit for power management according to claim 13, wherein said DELAY signal varies with various input voltage states applied to said input end for said DELAY signal.

15. An integrated circuit for power management according to claim 14, wherein said various input voltage states includes a high voltage state, a ground state and a floating state.

16. An integrated circuit for power management according to claim 1, wherein said clock generator is adapted to be electrically connected to a one-pinned crystal oscillating circuit.

17. An integrated circuit for power management according to claim 16, wherein said clock generator is electrically connected to said oscillating circuit through a single input pin to said integrated circuit.

18. An integrated circuit for power management according to claim 1, wherein said clock generator provides various clock signals for said integrated circuit.

19. An integrated circuit for power management according to claim 1, further comprising a latch electrically connected to said decoder for latching an output signal of said decoder.

20. An integrated circuit for power management according to claim 1, further comprising a Schmitt trigger electrically connected to said signal discriminator to change a voltage logic level of said input signal into a voltage logic level compatible with said signal discriminator.

21. An integrated circuit for power management according to claim 20, wherein said voltage logic level of said input signal is a transistor-transistor logic level.

22. An integrated circuit for power management according to claim 20, wherein said voltage logic level compatible with said signal discriminator is a MOSFET logic level.

23. An integrated circuit for power management according to claim 1, further comprising a multiplexer electrically connected between said signal discriminator and said decoder.

24. An integrated circuit for power management according to claim 1, further comprising a delay line electrically connected between said signal discriminator and said decoder for ensuring that said integrated circuit will work upon application of power.

\* \* \* \* \*